United States Patent [19]

Smart et al.

[11] Patent Number: 4,978,985
[45] Date of Patent: Dec. 18, 1990

[54] FILM CASSETTE HAVING FILM-EXPOSURE STATUS INDICATOR

[75] Inventors: David C. Smart, Rochester; Robert P. Cloutier, Spencerport; Daniel M. Pagano, Henrietta; Duane B. Kirk, Hilton, all of N.Y.

[73] Assignee: Eastman Kodak Company, Rochester, N.Y.

[21] Appl. No.: 384,332

[22] Filed: Jul. 24, 1989

[51] Int. Cl.$^5$ ............................................. G03B 17/26
[52] U.S. Cl. ................................... 354/275; 242/71.1
[58] Field of Search .................. 354/216, 275; 242/71, 242/71.1, 71.2; 352/78 R, 78 C; 206/409

[56] References Cited

U.S. PATENT DOCUMENTS

| | | | |
|---|---|---|---|
| 1,685,010 | 9/1928 | Thornton | 242/71.1 |
| 2,367,514 | 1/1945 | Mihalyi | 242/71 |
| 2,511,383 | 6/1950 | Summers | 242/71.1 |
| 2,591,417 | 4/1952 | Frye | 242/71.2 X |
| 3,086,862 | 4/1963 | Eagle et al. | 354/212 X |
| 3,467,341 | 9/1969 | Roman | 242/197 |
| 3,645,385 | 2/1972 | Bushnell | 242/71.1 X |
| 3,747,865 | 7/1973 | Tobey | 242/71.1 X |
| 3,768,894 | 10/1973 | Cook | 354/275 X |
| 3,784,001 | 1/1974 | Bushnell et al. | 242/71.1 X |
| 3,805,277 | 4/1974 | Domnick | 242/71.1 |
| 3,836,984 | 9/1974 | Hertel et al. | 354/275 |
| 4,311,377 | 1/1982 | Matteson | 354/275 X |
| 4,338,015 | 7/1982 | Holmes | 354/275 |
| 4,395,107 | 7/1983 | Lührig et al. | 354/275 |
| 4,423,943 | 1/1984 | Gold | 354/275 X |
| 4,443,077 | 4/1984 | Tanikawa | 354/275 X |
| 4,647,170 | 3/1987 | Storeham | 354/275 |
| 4,682,870 | 7/1987 | Atkinson | 354/275 |

FOREIGN PATENT DOCUMENTS 55-31541 7/1980 Japan .

OTHER PUBLICATIONS

Apparatus and Method for Identifying a Film Cartridge in a Particular Camera, #26901, Research Disclosure, Sep. 1986, pp. 511-515.
Camera Device for Encoding Conventional Film Cartrdige, #26922, Research Disclosure, Sep. 1986, pp. 531-535.
Apparatus for Encoding a Film Cartridge Used in a Particular Type Camera, #27256, Research Disclosure, Dec. 1986, pp. 739-744.

Primary Examiner—Brian W. Brown
Attorney, Agent, or Firm—Roger A. Fields

[57] ABSTRACT

A film cassette is disclosed wherein a filmstrip is advanced to the outside of a light-tight cassette shell in order to expose successive imaging areas of the filmstrip and can be returned to the inside of the cassette shell before all of the imaging areas have been exposed or after the filmstrip has been substantially completely exposed. According to the invention, a film-exposure status indicator is supported on the cassette shell for movement relative to the shell from a normal first position to successive second and third positions for providing respective visible indications that the filmstrip is generally unexposed, the filmstrip has been returned to the inside of the shell before all of its imaging areas have been exposed, and the filmstrip is substantially completely exposed.

16 Claims, 10 Drawing Sheets

FILM CASSETTE HAVING FILM-EXPOSURE STATUS INDICATOR

CROSS-REFERENCE TO RELATED APPLICATIONS

Reference is made to commonly assigned copending applications Ser. No. 07/296,473, entitled FILM CASSETTE, and filed Jan. 12, 1989 in the name of Donald M. Harvey, and Ser. No. 07/320,439, entitled FILM CASSETTE, and filed Mar. 8, 1989 in the names of Christopher T. Mattson and John J. Niedospial.

BACKGROUND OF THE INVENTION

1. Field of the Invention

The invention relates generally to the field of photography, and particularly to a film cassette containing roll film. More specifically, the invention relates to a film cassette having indicator means for informing the photographer that a filmstrip within the cassette is either partly exposed, substantially completely exposed, or generally unexposed.

2. Description of the Prior Art

In conventional 35 mm film manufacturers' cassettes, such as manufactured by Eastman Kodak Co. and Fuji Photo Film Co. Ltd., the filmstrip is wound on a flanged spool which is rotatably supported within a cylindrical shell. A leading or forwardmost portion of the filmstrip approximately 2⅜ inches long, commonly referred to as a "film leader", normally protrudes from a light-trapped slit or mouth of the cassette shell. One end of the spool has a short axial extension which projects from the shell, enabling the spool to be turned by hand. If the spool is manually rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Thus, rotation of the spool in the unwinding direction cannot serve to advance the filmstrip out of the shell, and it is necessary in the typical 35 mm camera to engage the protruding leader portion to draw the filmstrip out of the shell.

A 35 mm film cassette has been proposed which, unlike conventional film cassettes, can be operated to automatically advance a film leader out of the cassette shell by rotating the film spool in the unwinding direction. The film leader originally is located entirely within the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner wall of the cassette shell. The trailing end of the filmstrip is secured to the film spool, and the forward or leading end of the filmstrip is slightly tapered to allow it to freely extend from between the circumferential lips and rest against the shell wall at a location inwardly of a film passageway to the outside of the cassette shell. During initial unwinding rotation of the film spool, the leading end of the filmstrip is required to "seek" the entrance to the film passageway. Then, it is advanced into and through the film passageway to exit the cassette shell. If the filmstrip is rewound midroll into the cassette shell, i.e., before all of its available imaging areas have been exposed, because the photographer wishes to change the film type, the film leader will be returned to a location inwardly of the film passageway. Then, in order to re-use the filmstrip to expose its remaining imaging areas, the leading end of the film leader will be required again to seek the entrance to the film passageway to exit the cassette shell. The film passageway has a width that is slightly less than the width of the filmstrip, thus resulting in the filmstrip being transversely bowed as it is unwound from the film spool, and thereby facilitating movement of the film edges under the circumferential lips of the respective flanges. However, severe transverse bowing of the filmstrip to move its longitudinal edges under the circumferential lips results in increased friction between the filmstrip and the cassette shell which will impede advance of the filmstrip from the shell and may damage the filmstrip. Another problem arises from the fact that the leading end of the filmstrip appears to be approximately 1⅛ inch to 1¼ inch long (judging by the number of perforations illustrated in the leading end). In a high temperature and/or humidity environment, the ability of the filmstrip to clock-spring outwardly when coiled about the spool is lessened, and there is more of a tendency of the filmstrip to curl inwardly. As a result, the leading end because of its length may curl away from the shell wall, whereupon it may be unable to gain access to the film passageway when the film spool is rotated in the unwinding direction.

In conventional 35 mm film manufacturers' cassettes, after the filmstrip is completely exposed, the film spool is rotated in a winding direction to wind the film leader into the cassette shell. Since the film leader cannot subsequently be advanced out of the cassette shell (because of the binding effect between the film roll and the shell), this usually serves as an indication that the filmstrip is completely exposed. Conversely, in the film cassette disclosed in U.S. Pat. No. 4,423,943, the film leader can be automatically advanced out of the cassette shell by rotating the film spool in the unwinding direction. This can be done, assuming the leading end of the filmstrip is able to gain access to the film passageway of the shell, regardless of whether the filmstrip is unexposed, completely exposed, or partly exposed. Thus, the film cassette provides no indication as to the exposure status of the filmstrip.

THE CROSS-REFERENCED APPLICATIONS

Like the type of film cassette disclosed in U.S. Pat. No. 4,423,943, cross-referenced applications Ser. Nos. 07/296,473 and 07/320,439 each disclose a film cassette that contains a filmstrip which is automatically advanced through a film passageway to the outside of the cassette shell in response to rotation of the film spool in an unwinding direction.

Cross-referenced application Ser. No. 07/320,439 discloses a film cassette wherein a film spool is rotatable within the cassette shell in film unwinding and winding directions; a convoluted film roll whose outermost convolution is a film leader is coiled about the spool; a pair of film constraining flanges are coaxially arranged on the spool to radially confine the film leader to prevent the leader from substantially contacting an interior wall of the cassette shell; and a film stripper-guide is received between a leading end of the film leader and the next-inward convolution of the film roll succeeding the leader to remove the leader from the flanges and guide it through a film passageway the exterior of the cassette shell responsive to rotation of the spool in the film unwinding direction. According to the invention, the cassette shell and the film leader include mutual engagement means for securing the leader substantially proximate its leading end responsive to rotation of the spool in the film winding direction to prevent the leading end from coming to rest between the stripper-guide and the next-inward convolution. If, conversely, the leading end was stored between the stripper-guide and the next-inward convolution, the film leader might develop an inward curl sufficient to keep it out of range of the stripper-guide.

Cross-referenced application Ser. No. 07/296,473 discloses a film cassette adapted to propel a leading portion of a filmstrip from a light-tight cassette shell in response to rotation of a film spool in an unwinding direction. When the leading portion is advanced to exit the cassette shell, it falls off an "exposure-not-completed" indicator support to uncover the support. At the same time, the filmstrip continues to cover an "exposure-completed" indicator support. The exposure-completed indicator support is only uncovered when a trailing portion of the filmstrip falls off the support, after all of the available imaging areas of the filmstrip have been exposed. Conversely, should the filmstrip be rewound into the cassette shell midroll, i.e. before all of its imaging areas have been exposed, the exposure-completed indicator support remains covered. Thus, respective indications can be provided that the filmstrip is either partly or fully used.

SUMMARY OF THE INVENTION

A film cassette is provided wherein a filmstrip is advanced to the outside of a light-tight cassette shell in order to expose successive imaging areas of the filmstrip and can be returned to the inside of the cassette shell before all of the imaging areas have been exposed or after the filmstrip has been substantially completely exposed. According to the invention, a film-exposure status indicator is supported on the cassette shell for movement relative to the shell from a normal first position to successive second and third positions for providing respective visible indications that the filmstrip is generally unexposed, the filmstrip has been returned to the inside of the shell before all of its imaging areas have been exposed, and the filmstrip is substantially completely exposed. The cassette shell and the indicator include cooperative engagement means for preventing movement of the indicator to its first position when the indicator is in its second position and for preventing movement of the indicator to the first and second positions when the indicator is in its third position. Preferably, the cooperative engagement means limits movement of the indicator unidirectionally from its first position to its second position and from the second position to its third position, and prevents movement of the indicator out of the third position.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
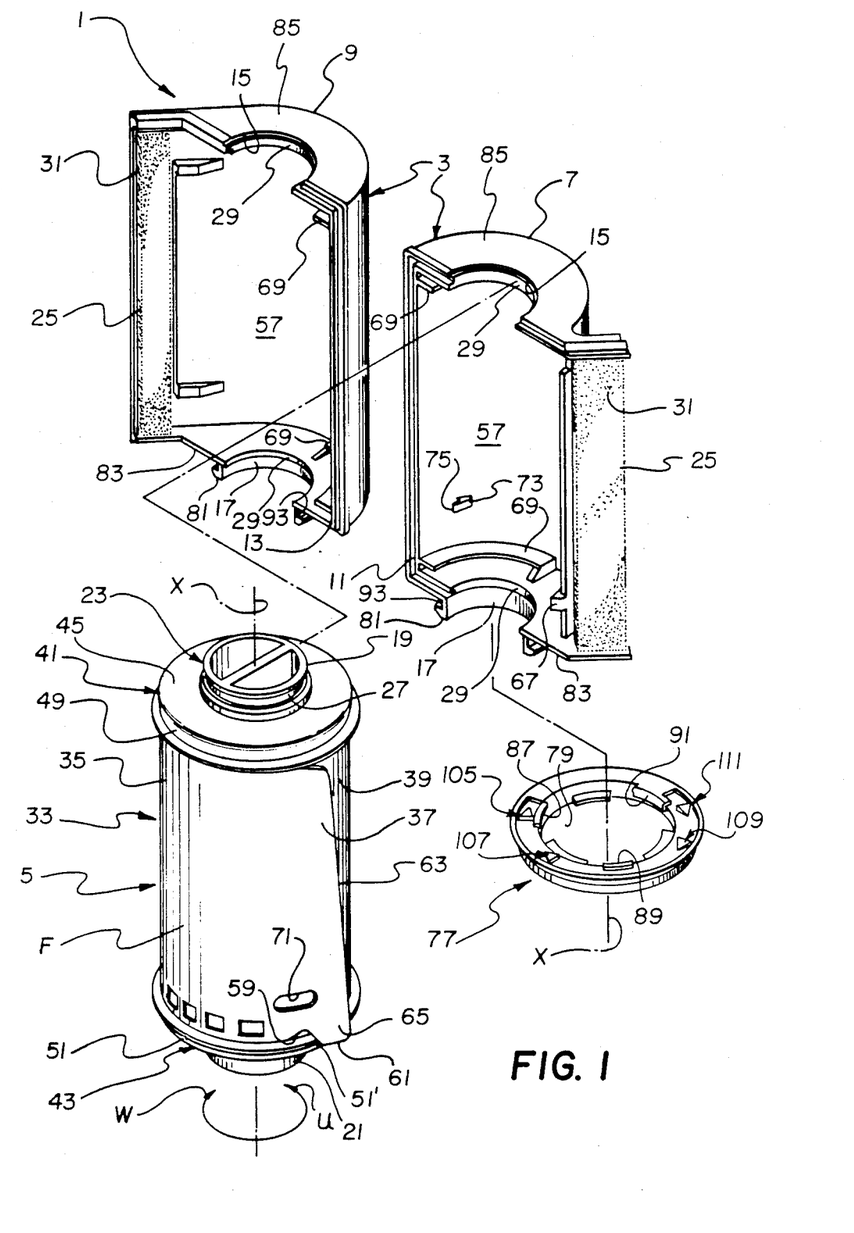
FIG. 1 is an exploded perspective view of a film cassette having a film-exposure status indicator according to a preferred embodiment of the invention.
Figure 2:
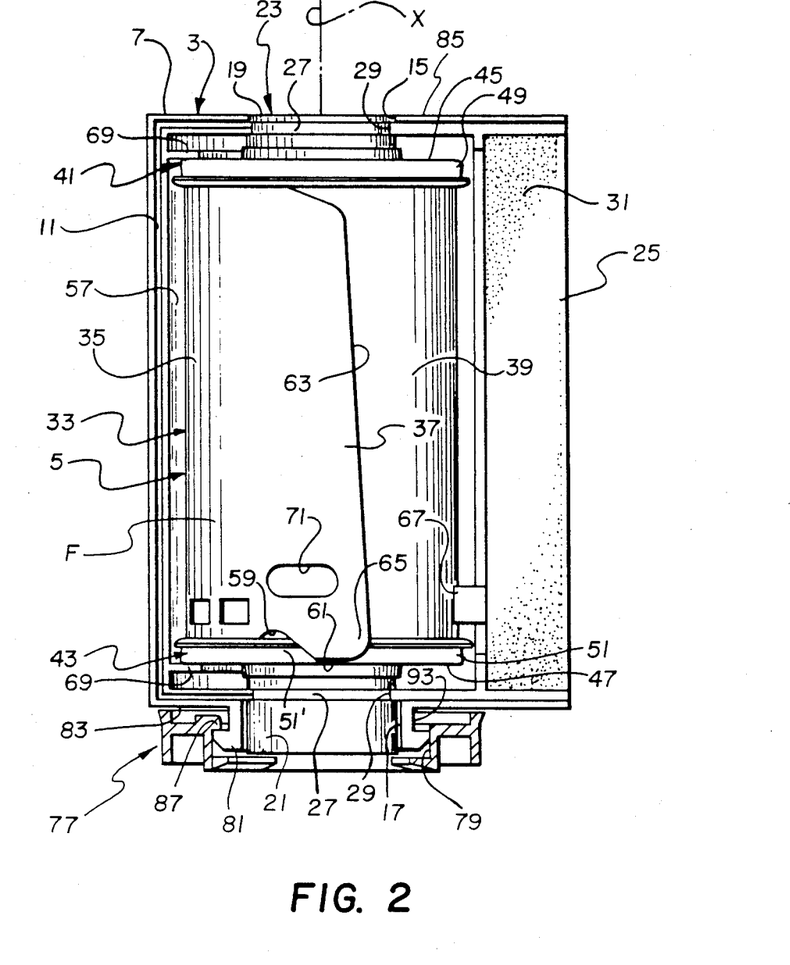
FIG. 2 is an elevation view of the film cassette, illustrating the cassette shell open to reveal a film roll coiled about a film spool.

Referring now to the drawings, FIGS. 1 and 2 depict a 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite end extensions 19 and 21 of a spool core or hub 23, and they define a film passageway 25 to the exterior of the cassette shell 3. The longer and shorter end extensions 19 and 21 of the spool core 23 each include an annular groove 27 which mates with a corresponding edge 29 of the respective openings 15 and 17 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
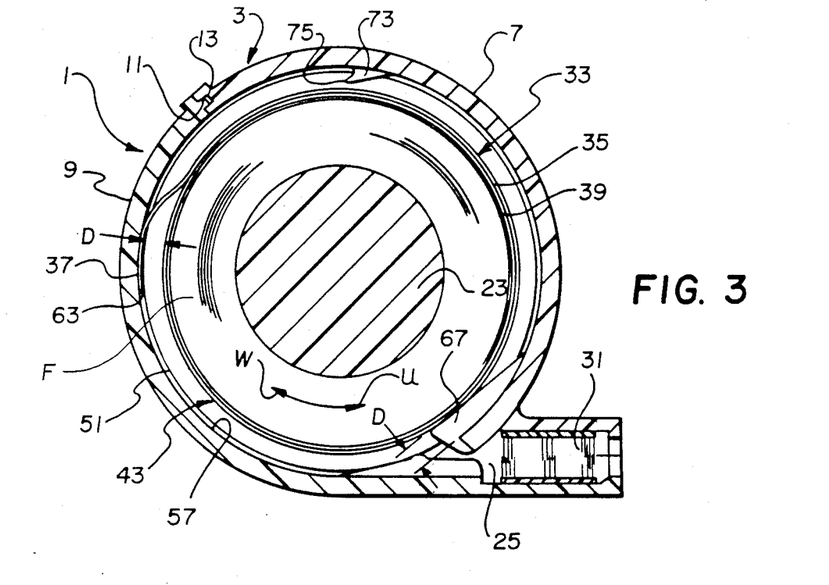
FIGS. 3 and 4 are end views in cross-section of the cassette shell, the film roll, and the film spool.

A roll 33 of 35 mm filmstrip F is coiled about the spool core 23 to form successive film convolutions. As shown in FIG. 3, the film roll 33 includes an outermost convolution 35 which is a film leader having a leading or forward end 37, and it includes a next-inward convolution 39 coiled behind the outermost convolution. The inner or trailing end of an innermost convolution, not shown, of the film roll 33 is secured to the spool core 23.

Figure 5:
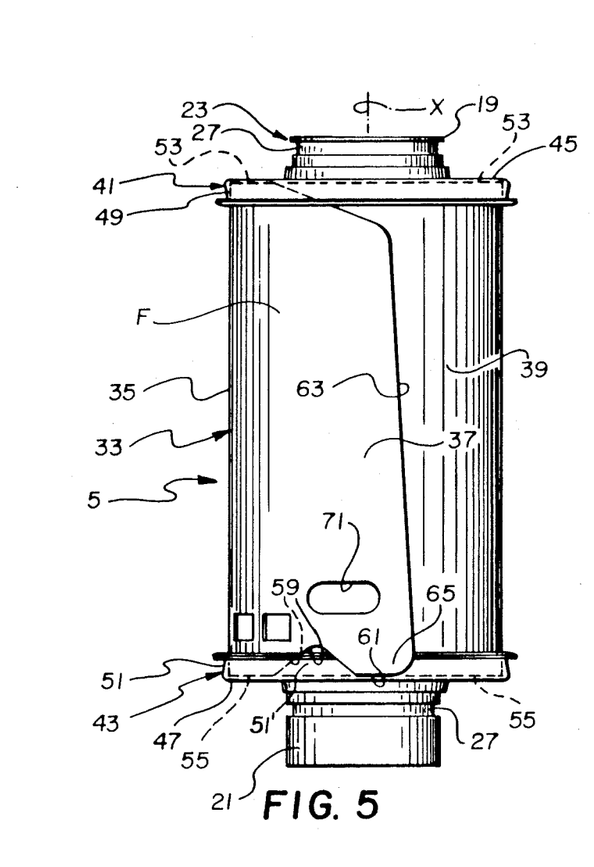
FIGS. 5 and 6 are elevation views of the film roll and the film spool, illustrating the manner in which the film roll is stored on the film spool.
Figure 6:
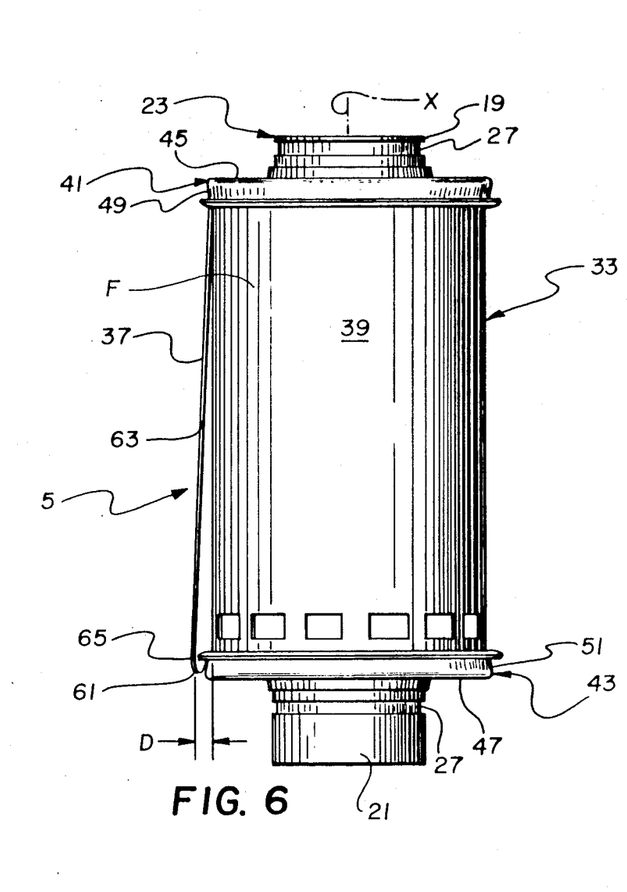
Figure 7:
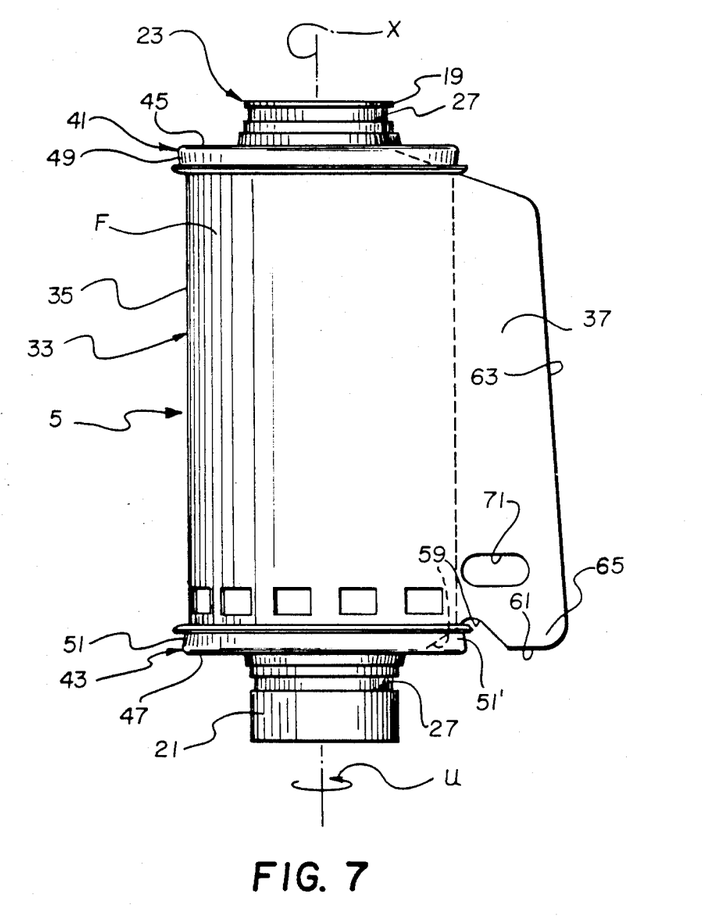
FIGS. 7 and 8 are elevation views similar to FIGS. 5 and 6, illustrating the manner in which the film roll is unwound from the film spool.

A pair of upper and lower identical, very thin, flexible film constraining flanges 41 and 43 are coaxially spaced along the spool core 23 as shown in FIGS. 1, 2, and 5. The two flanges 41 and 43 comprise respective integral disks 45 and 47 and respective integral annular lips or skirts 49 and 51 which circumferentially extend from the disks. The two disks 45 and 47 cover opposite flat sides, not shown, of the film roll 33 which are defined by corresponding opposite longitudinal edges 53 and 55 of each successive convolution of the film roll, and they have respective central holes, not shown, through which the spool core 23 axially extends to permit rotation of the spool core relative to the flanges 41 and 43. See FIG. 5. The annular lips 49 and 51 overlap the outermost convolution (film leader) 35 of the film roll 33 radially outwardly of the respective longitudinal edges 53 and 55 of that convolution to radially confine the convolution to thus prevent it from radially expanding or clock-springing into substantial contact with an interior curved wall 57 of the cassette shell 3. A lip-receiving notch 59 is cut in the outermost convolution (film leader) 35 along its longitudinal edge 55, relatively close to its leading end 37, to receive a peripheral section 51' of the annular lip 51. This allows a relatively short edge-section 61 of the outermost convolution (film leader) 35 connecting the leading end 37 and the notch 59 to overlap the annular lip 51 radially outwardly to thus maintain the leading end spaced a radial distance D from the next-inward convolution 39 of the film roll 33. See FIGS. 3 and 6. The leading end 37 has a forward edge 63 inclined from the longitudinal edge 53 of the outermost convolution 35 to the other longitudinal edge 55 of that convolution to form a forwardmost tip or tab 65 of the convolution which, like the edge-section 61, overlaps the annular lip 51 radially outwardly. See FIG. 5.

A film stripper-guide 67 formed with the cassette half 7 is positioned immediately inward of the inner entry to the film passageway 25 to be received between the leading end 37 of the outermost convolution (film leader) 35 and the next-inward convolution 39, to pick up the leading end and guide it into the film passageway responsive to rotation of the film spool 5 in the unwinding direction U. The leading end 37 will be advanced over the stripper-guide 67 and into the film passageway 25, rather than between the stripper-guide and the next-inward convolution 39, because it is spaced the radial distance D from the latter convolution. Thus, as shown in FIG. 3, the leading end 37 will be located within range of the stripper-guide 67 due to such spacing from the next-inward convolution 39.

Figure 8:
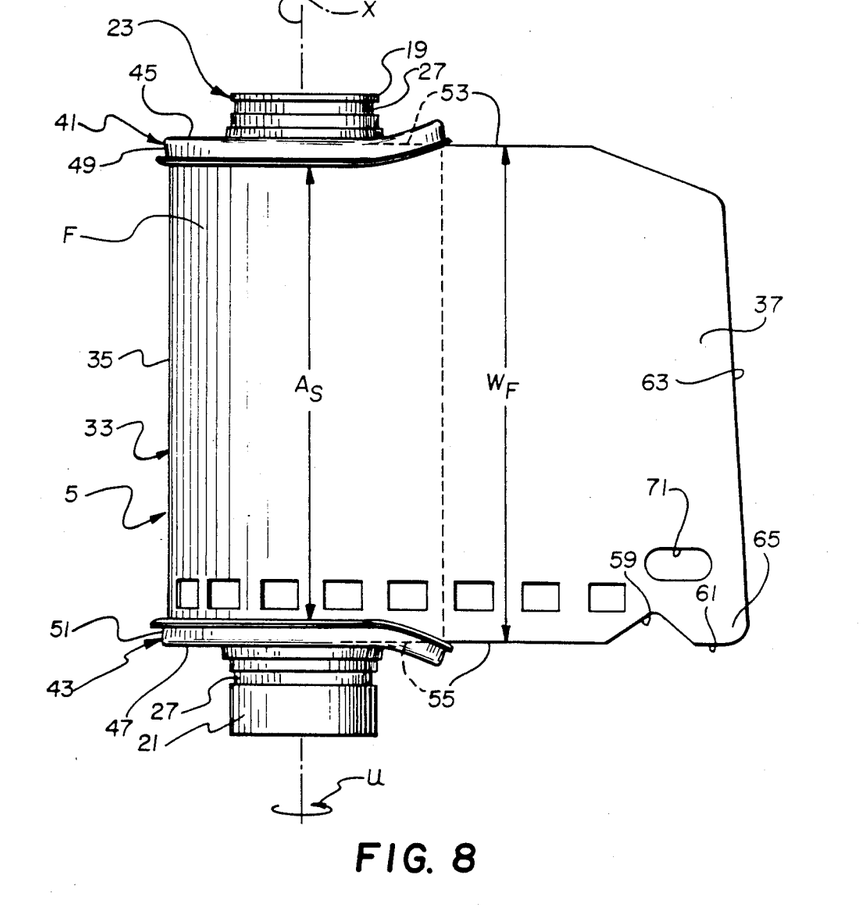

When the leading end 37 of the outermost convolution (film leader) 35 is advanced over the stripper-guide 67 responsive to rotation of the film spool 5 in the unwinding direction U, the longitudinal edges 53 and 55 of that convolution start to gently flex respective arcuate portions of the two flanges 41 and 43 axially away from one another as shown in FIG. 8, first to allow the notch 59 to separate from the lip section 51', and then to allow successive longitudinal sections of the film roll 33 (beginning with the leading end) to exit from between the flanges to the outside of the cassette shell 3. The local flexing of the flanges 41 and 43 occurs because the film width $W_F$ between the longitudinal edges 53 and 55 is slightly greater than the axial spacing $A_S$ the annular lips 49 and 51. Moreover, successive convolutions of the film roll 33 have a resistance to transverse bowing that is greater than the resistance of the flanges 41 and 43 to be locally flexed. A pair of flat curved bearing members 69 extend from the interior wall 57 of the cassette shell 3 to lie flatly against successive arcuate portions of the two disks 45 and 47 as the flanges 41 and 43 are locally flexed axially away from one another, to thereby return the flexed portions of the flanges to their normal original non-flexed condition.

Figure 4:
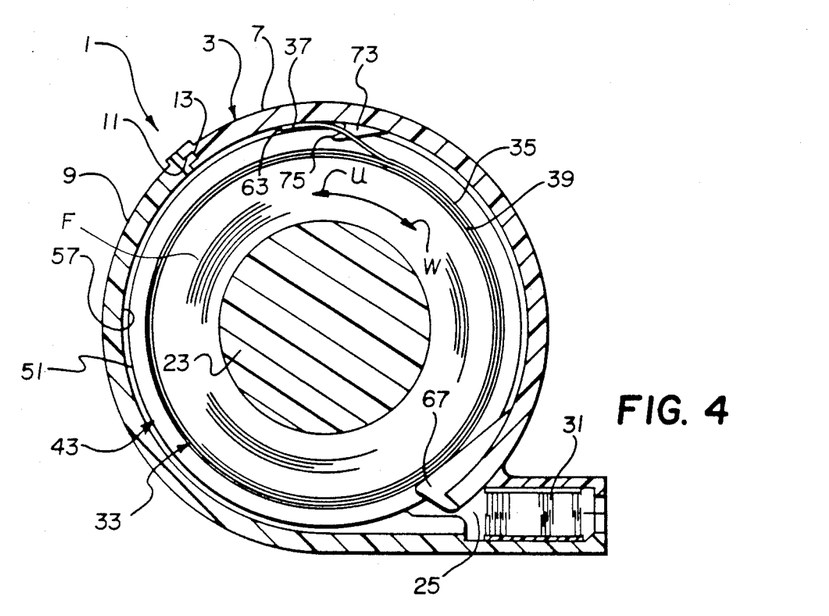

A slot 71 is cut in the outermost convolution (film leader) 35 substantially proximate its leading end 37. A tooth 73 fixed to the interior wall 57 of the cassette shell 3 has a free pointed end 75 which is positioned to be received in the slot 71 to thus engage the outermost convolution (film leader) 35, when the film spool 5 is rotated in the winding direction W as shown in FIG. 4, and to exit the slot to thus disengage that convolution, when the film spool is rotated in the unwinding direction U as shown in FIG. 3. The engagement of the outermost convolution 35 and the tooth 73 responsive to rotation of the film spool in the winding direction W prevents the leading end 37 of that convolution from coming to rest between the stripper-guide 67 and the next-inward convolution 39.

When (in a camera) the spool core 23 is initially rotated in the unwinding direction U, the two flanges 41 and 43 momentarily may remain stationary and the film roll 33, since its inner end is attached to the spool core, tends to expand radially or clock-spring to ensure a firm non-slipping relation between the outermost convolution (film leader) 35 of the film roll and the annular lips 49 and 51 of the flanges. Then, further rotation of the spool core 23 will similarly rotate the flanges 41 and 43. As a result, the leading end 37 of the outermost convolution (film leader) 35 will be advanced over the stripper-guide 67, causing successive arcuate portions of the flanges 41 and 43 to be flexed axially away from one another as shown in FIG. 8. This first allows the notch 59 to separate from the lip section 51', and then it allows successive longitudinal sections of the film roll 33 (beginning with the leading end 37) to exit from between the flanges to the outside of the cassette shell 3.

If (in the camera) the film spool 5 is rotated in the winding direction W before the entire length of the filmstrip F has been exposed, and it is desired to subsequently use the remaining available portion of the filmstrip at a later time, the film spool is rotated substantially until the slot 71 receives the free end 75 of the tooth 73 to thus engage the outermost convolution 35 (film leader) to the tooth. Thereafter, to use the remaining available portion of the filmstrip F (in the camera), the film spool 5 is rotated in the unwinding direction U to disengage the outermost convolution (film leader) 35 from the tooth 73 and to re-advance the filmstrip to the outside of the cassette shell 3.

THE FILM-EXPOSURE STATUS INDICATOR

Figures 9, 10:
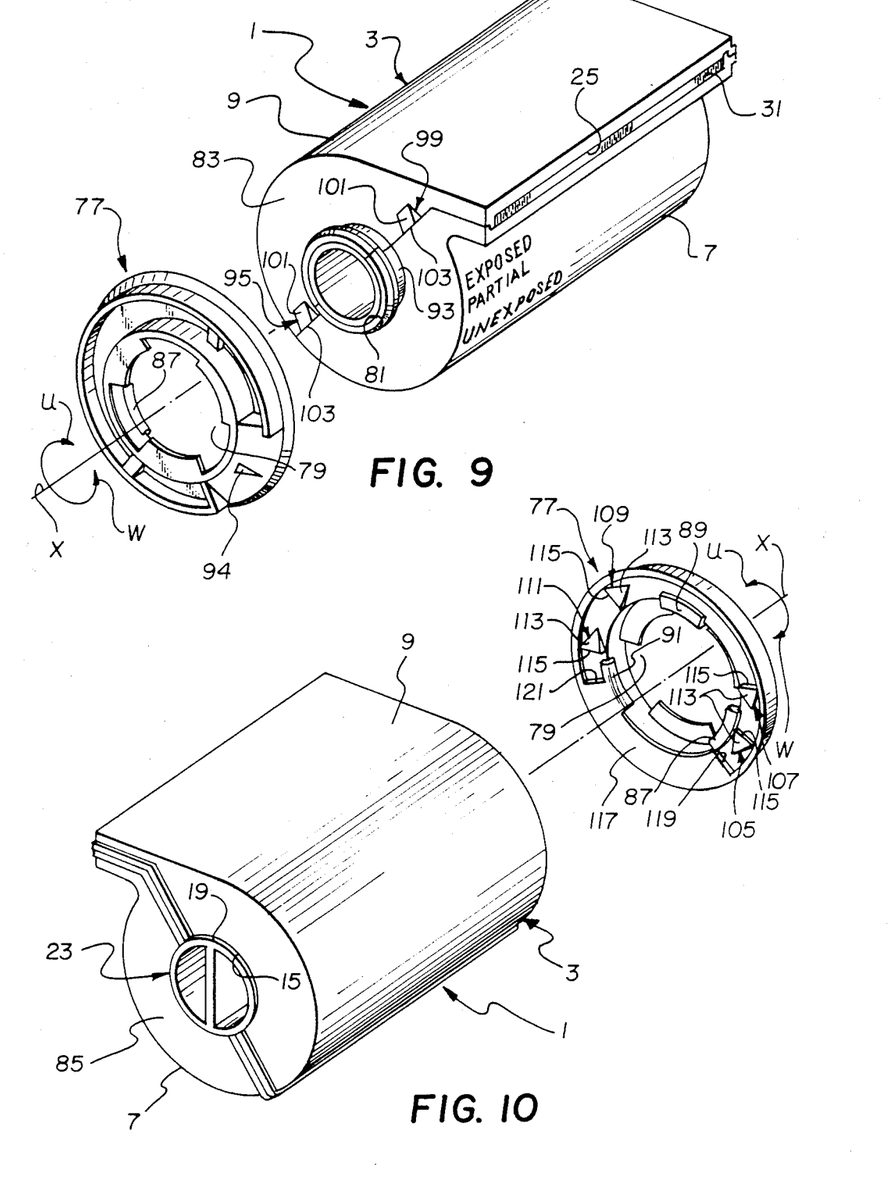
FIGS. 9 and 10 are exploded perspective views of the cassette shell and the film-exposure status indicator.

FIGS. 9 and 10 depict a ring-shaped film-exposure status indicator 77 having a central aperture 79 into which projects a neck-like extension 81 of one of two opposite exterior ends 83 and 85 of the cassette shell 3. The indicator 77 has three evenly spaced, radially inward tabs 87, 89, and 91 that fit into a peripheral annular groove 93 in the neck-like extension 81 to support the indicator for rotation about the axis X relative to the cassette shell 3 and the film spool 5.

Figure 11A:
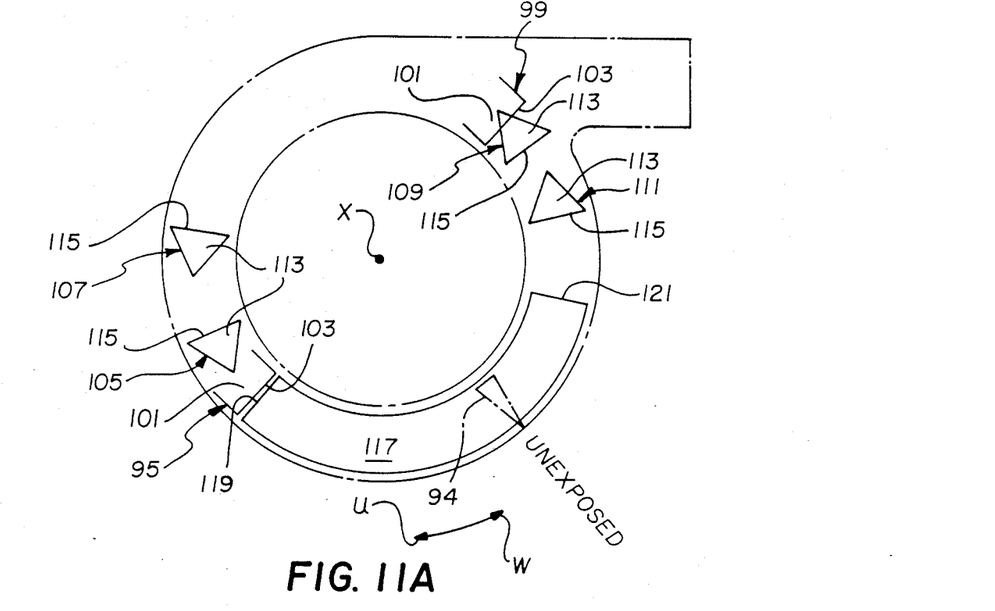
FIGS. 11A and 11B are schematic views depicting the indicator is a first position to indicate the film roll is substantially completely unexposed.
Figure 12A:
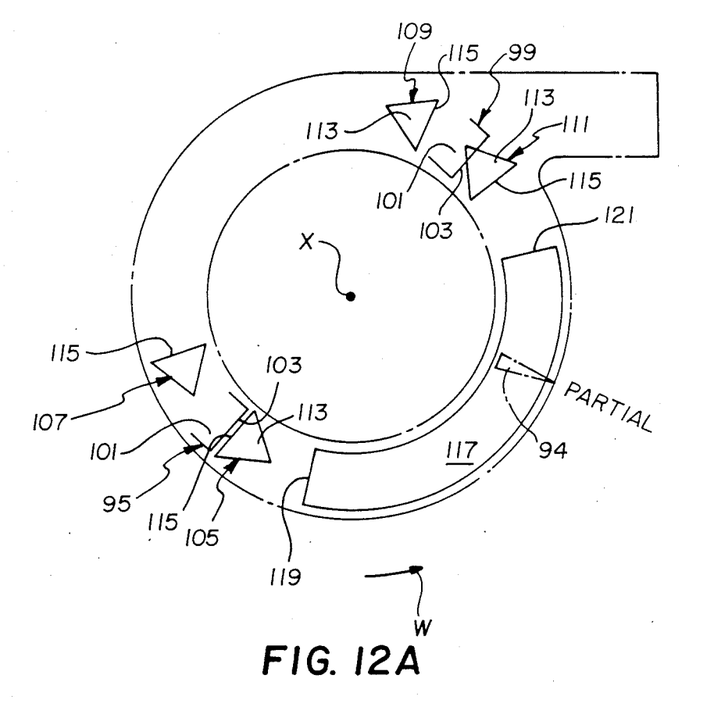
FIGS. 12A and 12B are schematic views depicting the indicator in a second position to indicate the film roll is only partially exposed.
Figure 13A:
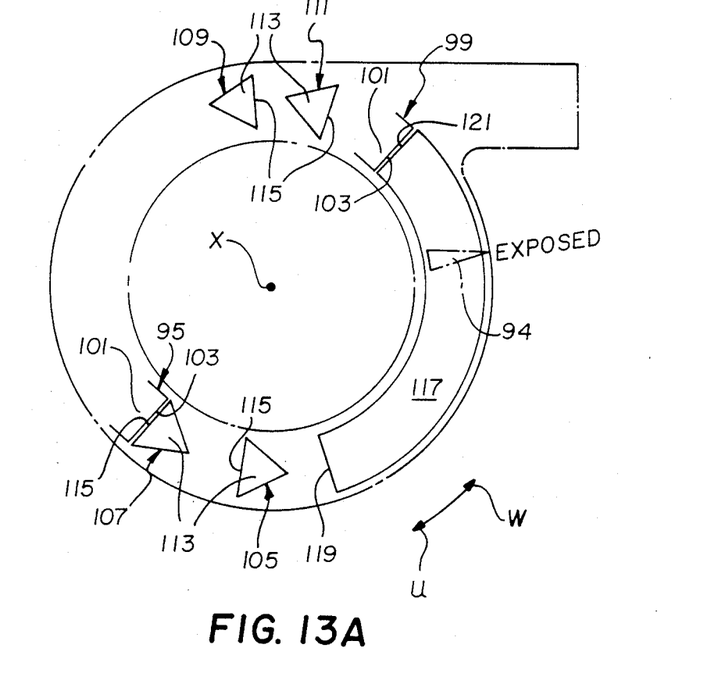
FIGS. 13A and 13B are schematic views depicting the indicator in a third position to indicate the film roll is substantially completely exposed.

The indicator 77 is intended to be rotated, for example in the winding direction W, from an original or normal first position, shown in FIG. 11A, to successive second and third positions, shown in FIGS. 12A and 13A, for providing respective visible indications that the filmstrip F stored in the cassette shell 3 is generally unexposed, the filmstrip has been returned to the inside of the shell before all of its imaging areas have been exposed, and the filmstrip is substantially completely exposed. To achieve these visible indications, a pointer 94 is formed on the indicator 77 for individual alignment with each of three successive imprints "UNEXPOSED", "PARTIAL", and "EXPOSED" printed on the outside of the cassette shell 3. See FIG. 9. When the indicator 77 is in its first position, shown in FIG. 11A, the pointer 94 points to the imprint "UNEXPOSED". When the indicator 77 is in its second position, shown in FIG. 12A, the pointer 94 points to the imprint "PARTIAL". When the indicator 77 is in its third position, shown in FIG. 13A, the pointer 94 points to the imprint "EXPOSED".

Figure 11B:
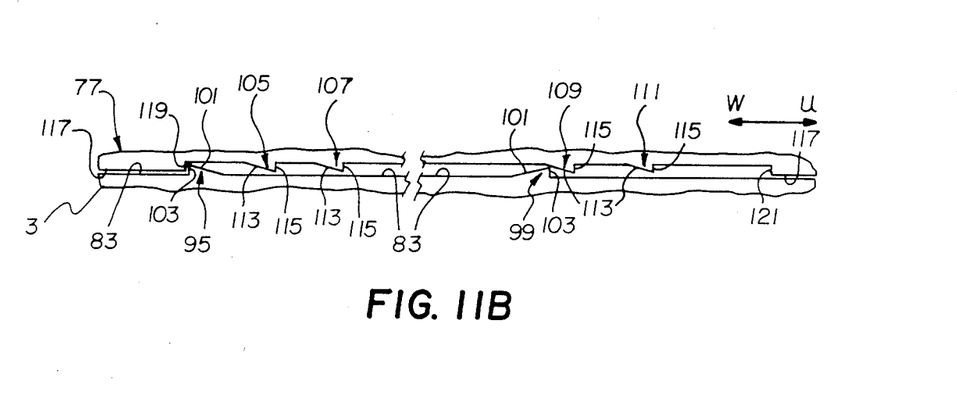
Figure 12B:
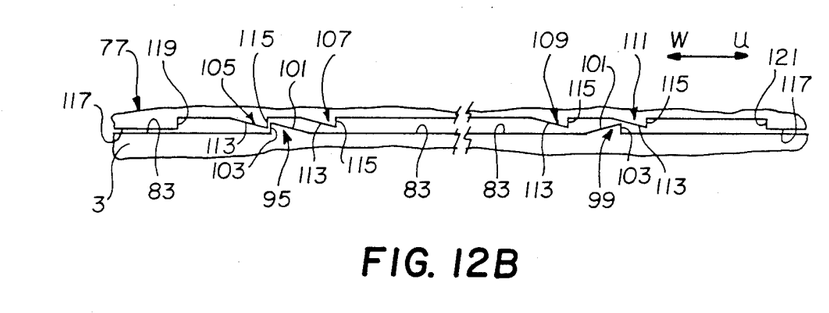
Figure 13B:
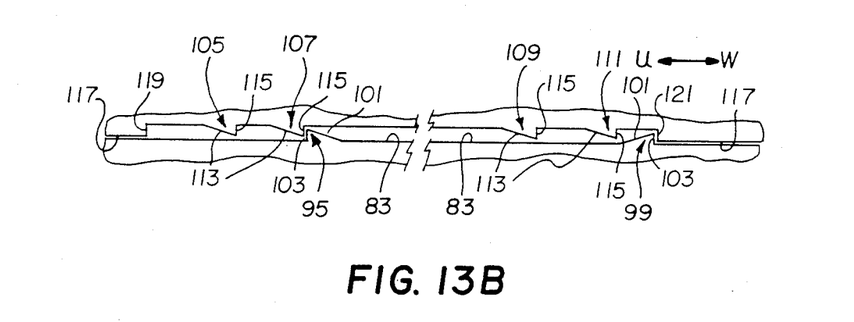

Cooperative engagement means are formed on the exterior end 83 of the cassette shell 3 and the underside of the indicator 77 for limiting rotation of the indicator unidirectionally in the winding direction W from its first position to its second position and from the second position to its third position, and for preventing rotation of the indicator out of the third position. Specifically, the engagement means formed on the exterior end 83 of the cassette shell 3 comprises a pair of identical ramps 95 and 99, each having an inclined surface 101 and a cliff surface 103, and being radially in-line and equally spaced from the axis X. See FIGS. 9, 11A, and 11B. The engagement means formed on the underside of the indicator 77 comprises four identical ramps 105, 107, 109, and 111, each having an inclined surface 113 and a cliff surface 115, and each being equally spaced from the axis X, and a single flat 117 having two identical cliff surfaces 121 and 119 similarly spaced from the axis X. See FIGS. 10, 11A and 11B. When the indicator is in its first position, shown in FIGS. 11A and 11B, the cliff surface 103 of the ramp 95 is located adjacent the cliff surface 119 of the flat 117, to absolutely prevent rotation of the indicator in the unwinding direction U, and the cliff surface 103 of the ramp 99 is located opposite the inclined surface 113 of the ramp 109, to lightly restrain the indicator from being rotated in the winding direction W. Thus, the indicator 77 is secured in the first position, but can be moved to the second position. If the indicator 77 is then rotated in the winding direction W, the inclined surface 113 of the ramp 109 will move over the cliff surface 103 of the ramp 99. When the indicator 77 is in its second position, shown in FIGS. 12A and 12B, the cliff surface 103 of the ramp 95 is located adjacent the cliff surface 115 of the ramp 105, to absolutely prevent rotation of the indicator in the unwinding direction U, and the cliff surface 103 of the ramp 99 is located opposite the inclined surface 113 of the ramp 111, to lightly restrain the indicator from being rotated in the winding direction W. Thus, the indicator 77 is secured in the second position, but can be moved to the third position. If the indicator 77 is then rotated in the winding direction W, the inclined surface 113 of the ramp 111 will move over the cliff surface 103 of the ramp 99. When the indicator 77 is in its third position, shown in FIGS. 13A and 13B, the cliff surface 103 of the ramp 95 is located adjacent the cliff surface 115 of the ramp 107, to absolutely prevent rotation of the indicator in the unwinding direction U, and the cliff surface 103 of the ramp 99 is located adjacent the cliff surface 121 of the flat 177, to absolutely prevent rotation of the indicator in the winding direction. Thus, the indicator 77 cannot be moved out of the third position.

The invention has been described with reference to a preferred embodiment. However, it will be appreciated that variations and modifications can be effected within the ordinary skill in the art without departing from the scope of the invention. For example, the indicator 77 could have other positions in addition to its first, second, and third positions for providing exposure-related or other kinds of information.

I claim:

1. A film cassette wherein a filmstrip is advanced to the outside of a light-tight cassette shell in order to expose successive imaging areas of said filmstrip and can be returned to the inside of said cassette shell before all of said imaging areas have been exposed or after the filmstrip has been substantially completely exposed, characterized in that:

a film-exposure status indicator is supported on said cassette shell for movement relative to the shell from a normal first position to successive second and third positions for providing respective visible indications that said filmstrip is generally unexposed, the filmstrip has been returned to the inside of the shell before all of its imaging areas have been exposed, and the filmstrip is substantially completely exposed; and said cassette shell and said indicator include cooperative engagement means for preventing movement of the indicator to its first position when the indicator is in its second position and for preventing movement of the indicator to the first and second positions when the indicator is in its third position.

2. A film cassette as recited in claim 1, wherein said cooperative engagement means includes respective engageable surfaces located on said cassette shell and said indicator for limiting movement of the indicator unidirectionally from its first position to its second position and from the second position to its third position 3. A film cassette as recited in claim 1 or 2, wherein said cooperative engagement means includes respective engageable surfaces located on said cassette shell and said indicator for preventing movement of the indicator out of its third position when the indicator is in that position.

4. A film cassette as recited in claim 1, wherein said filmstrip is stored in roll form on a film spool supported within said cassette shell between opposite exterior ends of the shell for rotation in an unwinding direction to advance the filmstrip to the outside of the shell and in a winding direction to return the filmstrip to the inside of the shell, and said indicator is supported at one of said exterior ends of the shell for rotation coaxially with respect to said film spool from its first position to its second and third positions.

5. A film cassette as recited in claim 4, wherein said cooperative engagement means limits rotation of said indicator unidirectionally in one of the unwinding and winding directions from its first position to its second position and from the second position to its third position.

6. A film cassette as recited in claim 5, wherein said cooperative engagement means prevents rotation of said indicator in the unwinding and winding directions when the indicator is in its third position.

7. A film cassette as recited in claim 6, wherein said cooperative engagement means includes respective engageable surfaces integrally formed with one of said exterior ends of the cassette shell and with said indicator, said engageable surfaces being substantially evenly spaced from the rotational axis of the indicator to permit their, engagement.

8. A film cassette wherein a filmstrip is advanced to the outside of a light-tight cassette shell in order to expose successive imaging areas of said filmstrip and can be returned to the inside of said cassette shell before all of said imaging areas have been exposed or after the filmstrip has been substantially completely exposed, characterized in that:
- a film-exposure status indicator is supported on said cassette shell for movement relative to the shell from a normal first position to successive second and third positions for providing respective visible indications that said filmstrip is generally unexposed, the filmstrip has been returned to the inside of the shell before all of its imaging areas have been exposed, and the filmstrip to substantially completely exposed; and
- said cassette shell and said indicator include cooperative engagement means for preventing movement of the indicator to its first position when the indicator is in its second position, though permitting movement of the indicator to its third position, and for preventing movement of the indicator out of the third position when the indicator is in that position.

9. A film cassette wherein a filmstrip is advanced to the outside of a light-tight cassette shell in order to expose successive imaging areas of said filmstrip and can be returned to the inside of said cassette shell before all of said imaging areas have been exposed or after the filmstrip has been substantially completely exposed, characterized in that:
- a film-exposure status indicator is supported on said cassette shell for movement relative to the shell from only one first position for providing a visible indication that said filmstrip is generally unexposed, to only one second position for providing a visible indication that the filmstrip has been returned to the inside of the shell before all of its imaging areas have been exposed, and to only one third position for providing a visible indication that the filmstrip is substantially completely exposed; and
- said cassette shell and said indicator include cooperative engagement means for preventing movement of the indicator to its first position when the indicator is in its second position and for preventing movement of the indicator to the first and second positions when the indicator is in its third position.

10. A film cassette wherein a filmstrip is advanced to the outside of a light-tight cassette shell in order to expose successive imaging areas of said filmstrip and can be returned to the inside of said cassette shell before all of said imaging areas have been exposed or after the filmstrip has been substantially completely exposed, characterized in that:
a film-exposure status indicator is supported on said cassette shell for movement relative to the shell from only one first position for providing a visible indicator that said filmstrip is generally unexposed, to only one second position for providing a visible indication that the filmstrip has been returned to the inside of the shell before all of its imaging areas have been exposed, and to only one third position for providing a visible indication that the filmstrip is substantially completely exposed.

11. A film cassette wherein a filmstrip is advanced to the outside of a light-tight cassette shell in order to expose successive imaging areas of said filmstrip and can be returned to the inside of said cassette shell before all of said imaging areas have been exposed or after the filmstrip has been substantially completely exposed, characterized in that:
- a film-exposure status indicator is supported on said cassette shell for movement relative to the shell from one position for providing a visible indication that said filmstrip is generally unexposed to another position for providing a visible indication that the filmstrip is exposed; and
- said cassette shell and said indicator include cooperative engagement means for preventing return of the indicator to the one position when the indicator is in the other position.

12. A film cassette as recited in claim 11, wherein said cooperative engagement means includes respective engageable surfaces located on said cassette shell and said indicator for limiting movement of the indicator unidirectionally from the one position to the other position.

13. A film cassette as recited in claim 11 or 12, wherein said cooperative engagement means includes respective engageable surfaces located on said cassette shell and said indicator for preventing movement of the indicator out of the other position when the indicator is in that position.

14. A film cassette as recited in claim 11, wherein said filmstrip is stored in roll form on a film spool supported within said cassette shell between opposite exterior ends of the shell for rotation in an unwinding direction to advance the filmstrip to the outside of the shell and in a winding direction to return the filmstrip to the inside of the shell, and said indicator is supported at one of said exterior ends of the shell for rotation coaxially with respect to said film spool from the one position to the other position.

15. A film cassette as recited in claim 14, wherein said cooperative engagement means limits rotation of said indicator unidirectionally in either the unwinding direction or the winding direction from the one position to the other position.

16. A film cassette as recited in claim 15, wherein said cooperative engagement means prevents rotation of said indicator in the unwinding and winding directions when the indicator is in the other position.

* * * * *

UNITED STATES PATENT AND TRADEMARK OFFICE
CERTIFICATE OF CORRECTION

PATENT NO. : 4,978,985

DATED : Dec. 18, 1990

INVENTOR(S) : D.C. Smart, R.P. Cloutier, D.M. Pagano, D.B. Kurk

It is certified that error appears in the above-identified patent and that said Letters Patent is hereby corrected as shown below:

| Column and Line In Printed Patent | Page or Claim and Line in Application | Mistake Noted |
|---|---|---|
| Col 5, line 60 | | after $A_5$ insert the word --between-- |

Signed and Sealed this

Second Day of July, 1991

Attest:

HARRY F. MANBECK, JR.

*Attesting Officer*  *Commissioner of Patents and Trademarks*